(12) United States Patent
Sameer

(10) Patent No.: US 11,557,059 B2
(45) Date of Patent: Jan. 17, 2023

(54) SYSTEM AND METHOD FOR DETERMINING POSITION OF MULTI-DIMENSIONAL OBJECT FROM SATELLITE IMAGES

(71) Applicant: HERE GLOBAL B.V., Eindhoven (NL)

(72) Inventor: Priyank Sameer, Mumbai Maharashtra (IN)

(73) Assignee: HERE GLOBAL B.V., Eindhoven (NL)

( * ) Notice: Subject to any disclaimer, the term of this patent is extended or adjusted under 35 U.S.C. 154(b) by 71 days.

(21) Appl. No.: 16/358,333

(22) Filed: Mar. 19, 2019

(65) Prior Publication Data

US 2020/0302644 A1 Sep. 24, 2020

(51) Int. Cl.
*G06T 17/05* (2011.01)
*G06T 7/73* (2017.01)
(Continued)

(52) U.S. Cl.
CPC .................. *G06T 7/75* (2017.01); *G06T 7/60* (2013.01); *G06T 17/05* (2013.01); *G06V 20/13* (2022.01);
(Continued)

(58) Field of Classification Search
CPC ......... G05D 1/0088; G05D 2201/0213; G05D 1/0278; G05D 1/0246; G05D 1/0251;
(Continued)

(56) References Cited

U.S. PATENT DOCUMENTS

| 2008/0162035 A1* | 7/2008 | Charlton ................ G09B 29/12 |
| | | 701/461 |
| 2011/0007094 A1* | 1/2011 | Nash ...................... G06F 16/51 |
| | | 382/282 |

(Continued)

FOREIGN PATENT DOCUMENTS

| CN | 104463868 A | 3/2015 |
| CN | 107527038 A | 12/2017 |

OTHER PUBLICATIONS

Liasis et al., Satellite images analysis for shadow detection and building height estimation, Sep. 2016 [retrieved Sep. 26, 2020], ISPRS Journal of Photogrammetry and Remote Sensing, vol. 119, pp. 437-450. Retrieved: https://www.sciencedirect.com/science/article/pii/S0924271616301939 (Year: 2016).*

(Continued)

*Primary Examiner* — Matthew C Bella
*Assistant Examiner* — Dennis Rosario
(74) *Attorney, Agent, or Firm* — Ditthavong, Steiner & Mlotkowski

(57) ABSTRACT

Various aspects of a system and a method for determining a position of one or more multi-dimensional objects are disclosed herein. In accordance with an embodiment, the system may include a memory and a processor. The processor may be configured to obtain, from a plurality of satellite images, shadow data of a first multi-dimensional object from one or more multi-dimensional objects on a visible surface. The processor may be configured to obtain, from a server, base elevation data and height data of the first multi-dimensional object. The processor may be further configured to generate a Digital Elevation Model (DEM) of the plurality of multi-dimensional objects. The processor may be further configured to determine a position of a second multi-dimensional object of the plurality of multi-dimen-
(Continued)

sional objects on the visible surface, based on the generated DEM.

20 Claims, 4 Drawing Sheets

(51) Int. Cl.
    *G06T 7/60*         (2017.01)
    *G06V 20/13*       (2022.01)

(52) U.S. Cl.
    CPC ............ *G06T 2207/10032* (2013.01); *G06T 2207/30184* (2013.01); *G06T 2207/30188* (2013.01)

(58) Field of Classification Search
    CPC .......... G06K 9/00798; G06K 9/00637; G06K 9/0063; G06K 2009/00644; G06K 9/00657; G06T 2207/10032; G06T 7/70; G06T 17/05; G06T 7/33; G06T 2207/30181; G06T 19/00; G06T 17/00; G06T 7/344; G06T 15/00; G06T 19/20; G01C 21/32; G01C 21/3602; G06F 16/29; G06F 16/5854; G06F 9/5072; G06V 20/13

See application file for complete search history.

(56) References Cited

U.S. PATENT DOCUMENTS

| | | | | |
|---|---|---|---|---|
| 2011/0295575 | A1* | 12/2011 | Levine | G06F 30/20 703/2 |
| 2015/0371431 | A1* | 12/2015 | Korb | G06K 9/00208 382/113 |
| 2016/0292626 | A1* | 10/2016 | Green | G06Q 50/02 |
| 2017/0039765 | A1* | 2/2017 | Zhou | G06T 7/521 |
| 2017/0076438 | A1 | 3/2017 | Kottenstette et al. | |
| 2018/0075319 | A1 | 3/2018 | Xu et al. | |
| 2018/0336693 | A1* | 11/2018 | De Franchis | G01F 22/00 |
| 2020/0082168 | A1* | 3/2020 | Fathi | G06V 20/176 |
| 2022/0128695 | A1* | 4/2022 | Koger | G01S 7/4808 |

OTHER PUBLICATIONS

Alsayel, Towards Standardizing International Boundary Determination and Quality Control Consequences on Surveying and Mapping : Dissertation, 2010 [retr Sep. 26, 2020], Institut für Photogrammetrie und GeoInformation, 95 pgs. https://www.ipi.uni-hannover.de/en/research/publications/ (Year: 2010).*

Pieper et al., In-scene LWIR downwelling radiance estimation, Sep. 19, 2016, [retrieved Mar. 29, 2022], Proceedings of SPIE: Imaging Spectrometry XXI, vol. 9976, 20 pages. Retrieved: https://doi.org/10.1117/12.2239138 (Year: 2016).*

Borel, Error analysis for a temperature and emissivity retrieval algorithm for hyperspectral imaging data, May 7, 2007 [retrieved Mar. 29, 2022], Proceedings of SPIE: Algorithms and Technologies for Multispectral, Hyperspectral, and Ultraspectral Imagery XIII, vol. 6565, 13 pages. Retrieved: (Year: 2007) https://doi.org/10.1117/12.719784 (Year: 2007).*

Irvin et al., "Methods for Exploiting the Relationship Between Buildings and Their Shadows in Aerial Imagery", Published in IEEE Trans. Systems, Man, and Cybernetics 1989, Dec. 25, 1988, 23 pages.

Dare, "Shadow Analysis in High-resolution Satellite Imagery of Urban Areas", Photogrammetric Engineering & Remote Sensing, vol. 71, No. 2, Feb. 2005, pp. 169-177.

Poli et al., "Use of Satellite Imagery for Dem Extraction, Lanscape Modeling and Gis Applications", Published 2004, 8 pages.

* cited by examiner

SYSTEM AND METHOD FOR DETERMINING POSITION OF MULTI-DIMENSIONAL OBJECT FROM SATELLITE IMAGES

TECHNOLOGICAL FIELD

Various embodiments of the disclosure relate to a system and a method to generate a Digital Elevation Model (DEM). More particularly, the various embodiments of the present disclosure relate to a system and a method to determine a position of a multi-dimensional object captured in satellite images, from the generation of DEM.

BACKGROUND

Nowadays, the technology has progressed towards autonomous navigation where accurate data, such as location data, plays a vital role. Maps that are used for navigation may have different accuracies since the data for maps may be collected from different sources. The examples of the different existing sources may be airborne laser scanning, Interferometric Synthetic Aperture Radar (InSAR), traditional photogrammetry and normal satellite imagery.

In certain scenarios, each source may be captured from a satellite at different time intervals. As a result, the position of an object on the map may be shifted from an actual position of the object. The object may correspond to a building, a tree, a water tank, a power line and the like. In certain other scenarios, many sources may be unavailable at times and may be expensive for the purpose. Therefore, there is a need to determine the actual position of the object in reality from inexpensive sources and the sources available at any time because the right position of the object may be crucial in applications, such as autonomous vehicle navigation.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method are described for determining a position of multi-dimensional object from satellite images as shown in, and/or described in connection with, at least one of the figures, as set forth more completely in the claims.

Embodiments of the disclosure provide a system for determining a position of at least a second multi-dimensional object of a plurality of multi-dimensional objects, the system comprising at least one memory configured to store instructions and at least one processor configured to execute the instructions to obtain, from a plurality of satellite images, shadow data of at least a first multi-dimensional object of the plurality of multi-dimensional objects on a visible surface. The at least one purpose is further configured to obtain, from a server, base elevation data and height data of the at least first multi-dimensional object of the plurality of multi-dimensional objects on the visible surface; generate a Digital Elevation Model (DEM) of the plurality of multi-dimensional objects on the visible surface based on the shadow data, the base elevation data and the height data; and determine the position of the at least second multi-dimensional object of the plurality of multi-dimensional objects on the visible surface, based on the generated DEM.

According to one embodiment of the disclosure, the at least one processor is further configured to calculate shadow length of the at least first multi-dimensional object, based on the obtained shadow data of the at least first multi-dimensional object on the visible surface.

According to one embodiment of the disclosure, the plurality of multi-dimensional objects comprise natural structures and built structures, wherein the natural structures comprise trees and vegetation, and wherein the built structures comprise building, tower, water tank, and power lines.

According to one embodiment of the disclosure, the at least one processor is further configured to generate the DEM based on two or more overlapping images of the plurality of images.

According to one embodiment of the disclosure, the at least one processor is further configured to generate the DEM based on image resolution and image contrast of the plurality of images and a height-to-base-relation of the plurality of multi-dimensional objects.

According to one embodiment of the disclosure, the at least one processor is further configured to control a display device to display a visual representation of the position of the at least second multi-dimensional object on the visible surface.

According to one embodiment of the disclosure, the shadow data includes multi-direction shadows of the at least first multi-dimensional object.

Embodiments of the disclosure provide a method for determining a position of at least a second multi-dimensional object of a plurality of multi-dimensional objects, the method comprising obtaining, from a plurality of satellite images, shadow data of at least a first multi-dimensional object of the plurality of multi-dimensional objects on a visible surface, obtaining, from a server, base elevation data and height data of the at least first multi-dimensional object of the plurality of multi-dimensional objects on the visible surface. The method further comprises generating a Digital Elevation Model (DEM) of the plurality of multi-dimensional objects on the visible surface based on the shadow data, the base elevation data and the height data; and determining the position of the at least second multi-dimensional object of the plurality of multi-dimensional objects on the visible surface, based on the generated DEM.

Embodiments of the disclosure provide a computer program product comprising at least one non-transitory computer-readable storage medium having stored thereon computer-executable program code instructions which when executed by a computer, cause the computer to carry out operations for determining a position of at least a second multi-dimensional object of a plurality of multi-dimensional objects. The operations comprise obtaining, from a plurality of satellite images, shadow data of at least a first multi-dimensional object of the plurality of multi-dimensional objects on a visible surface; obtaining, from a server, base elevation data and height data of the at least first multi-dimensional object of the plurality of multi-dimensional objects on the visible surface; generating a Digital Elevation Model (DEM) of the plurality of multi-dimensional objects on the visible surface based on the shadow data, the base elevation data and the height data; and determining the position of the at least second multi-dimensional object of the plurality of multi-dimensional objects on the visible surface, based on the generated DEM.

These and other features and advantages of the present disclosure may be appreciated from a review of the following detailed description of the present disclosure, along with

BRIEF DESCRIPTION OF THE DRAWINGS

The embodiments of the invention are illustrated by way of example, and not by way of limitation, in the figures of the accompanying drawings in which.

DETAILED DESCRIPTION OF DRAWINGS

The following described implementations may be found in the disclosed system and method for determining a position of multi-dimensional object from satellite images. Exemplary aspects of the disclosure may include a system for determining a position of multi-dimensional object from satellite images. The system may include a memory configured to store instructions and a processor configured to execute the instructions. The system may be configured to determine a position of one or more multi-dimensional objects from satellite images.

The system may be configured to obtain, from a plurality of satellite images, shadow data of one or more multi-dimensional objects (such as, a first multi-dimensional object) of the plurality of multi-dimensional objects on a visible surface. The system may be configured to obtain, from a server, base elevation data and height data of one or more multi-dimensional objects (such as, a first multi-dimensional object) of the plurality of multi-dimensional objects on the visible surface. The system may be configured to generate a Digital Elevation Model (DEM) of the plurality of multi-dimensional objects on the visible surface based on the shadow data, the base elevation data and the height data. The system may be configured to determine the position of the at least second multi-dimensional object of the plurality of multi-dimensional objects on the visible surface, based on the generated DEM.

The system may be configured to generate an accurate Digital Elevation Model (DEM) to represent an actual position of the at least one multi-dimensional object. The generated Digital Elevation Models (DEMs) may be used in various applications, such as, but not limited to, generation of ortho-images, flood planning, erosion control, agriculture, generation of contour lines, visibility check, city modeling, object recognition, and creation of perspective views and 3D-views. Recently, high-resolution imaging satellites have been launched. Examples of such high-resolution imaging satellites may be SPOT-5, IKONOS, QUICKBIRD, ORBVIEW, and EOS-1 that may constitute an excellent source for efficient, economic, and accurate generation of DEM data for extended areas of the surface of the earth. The photographic data from a normal satellite may play an important role in generation of the DEM data. Advantageously, the photographic data of the normal satellites may be inexpensive as compared to other imagery sources, such as InSAR.

The accuracy of the generated DEM may depend on certain factors of a plurality of images captured as satellite imagery from the normal satellite. The certain factors may correspond to an image resolution of the plurality of images captured as satellite imagery through a satellite, image contrast of the plurality of images captured as satellite imagery through a satellite and height to base relation of at least one multi-dimensional object in a visible surface from the plurality of images captured as satellite imagery.

Figure 1:
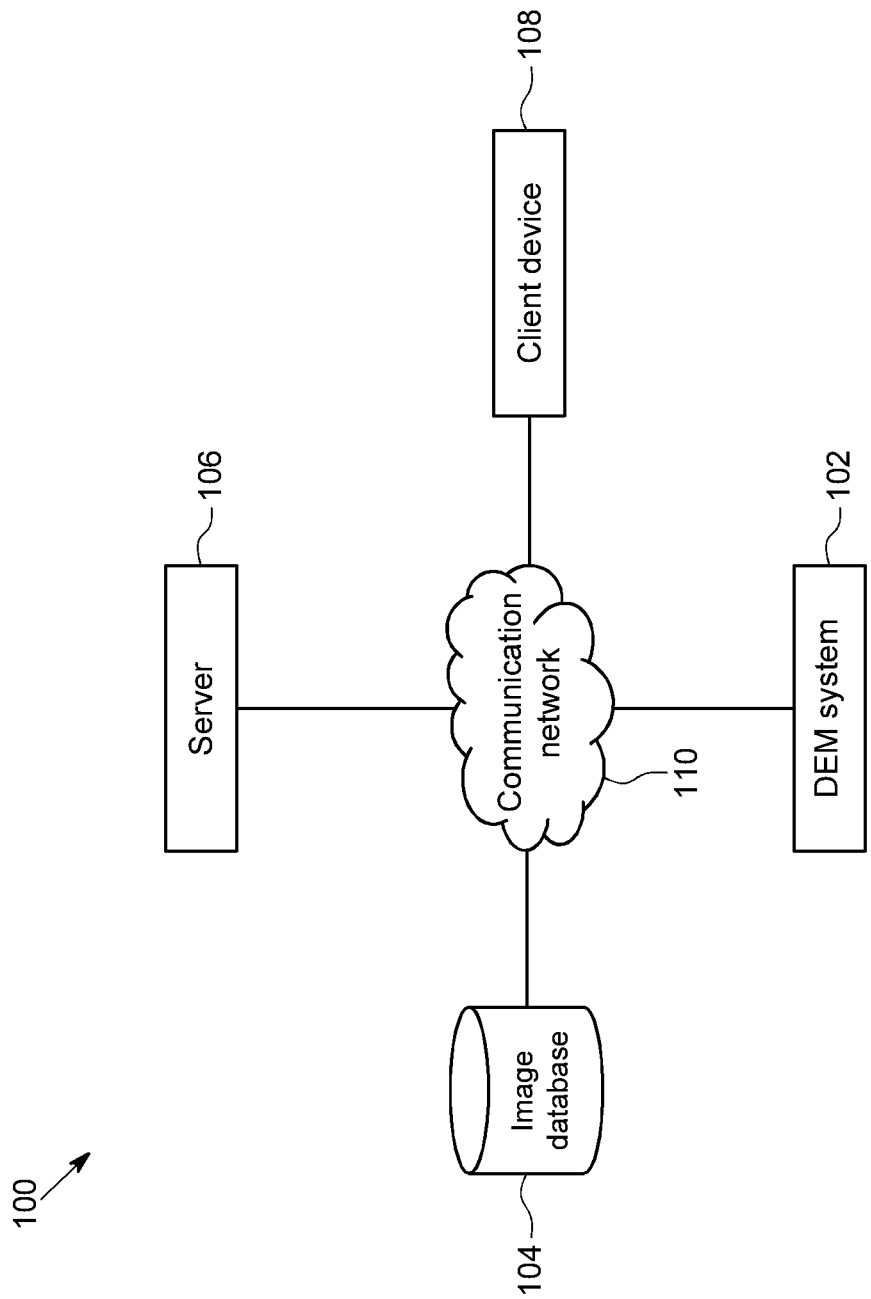
FIG. 1 is a block diagram that illustrates a network environment of a system for determining a position of multi-dimensional object from satellite images, in accordance with an embodiment.

FIG. 1 is a block diagram that illustrates a network environment of a system for determining a position of multi-dimensional object from satellite images, in accordance with an embodiment of the disclosure.

With reference to FIG. 1, there is shown a network environment 100 that may include a Digital Elevation System (DEM) system 102, an image database 104, a server 106, a client device 108 and a communication network 110. The DEM system 102 may be communicatively coupled to the image database 104, via the communication network 110. In accordance with an embodiment, the DEM system 102 may be directly coupled to the image database 104. Further, the DEM system 102 may be communicatively coupled to the server 106, via the communication network 110. Furthermore, the DEM system 102 may be communicatively coupled to the client device 108, via the communication network 110. The client device 108 may be integrated with a display device (not shown in the FIG. 1) or communicatively coupled to the display device, via the communication network 110.

All the components in the network environment 100 may be coupled directly or indirectly to a communication network 110. The components described in the network environment 100 may be further broken down into more than one component and/or combined together in any suitable arrangement. Further, one or more components may be rearranged, changed, added, and/or removed.

The DEM system 102 may comprise suitable logic, circuitry, interfaces, and code that may be configured to generate a Digital Elevation Model (DEM) of a plurality of multi-dimensional objects on a visible surface captured from satellite images. The DEM system 102 may be further configured to determine a position of multi-dimensional object (such as, a building) from satellite images. The DEM system 102 may be further configured to generate shadow length of one or more multi-dimensional objects from the plurality of multi-dimensional objects. The DEM system 102 may be further configured to control a display device to display a visual representation of the position of one or more multi-dimensional objects on the visible surface. Examples of the DEM system 102 may include, but are not limited to, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The image database 104 may comprise suitable logic, circuitry, interfaces, and code that may be configured to provide imagery data to the DEM system 102. In accordance with an embodiment, the image database 104 may acquire sensory data from, but not limited to, satellite imagery, aerial imagery, radar, sonar, Light Detection and Ranging (LIDAR), seismography, or any other suitable mode or combination of modes of sensory information. In some embodiments, the DEM system 102 may obtain the imagery data from third-party vendors. The image database 104 may include remote acquisition of the sensory information by using remote sensing that may not require direct physical contact. In accordance with an embodiment, the image database 104 may include scalable read replicas to support dynamic usage. The image database 104 may be located in a local storage medium, a remote storage medium 2612, or the DEM system 102, and/or any other suitable components, combinations of components, or locations of the network environment 100.

The server 106 may comprise suitable logic, circuitry, interfaces, and code that may be configured to provide base elevation data and height data of one or more multi-dimensional objects (such as, buildings, towers and trees) from the plurality of multi-dimensional objects on the visible surface captured in satellite imagery. In accordance with an embodiment, the server 106 may be configured to provide a near real-time geospatial index of places, objects, entities, and knowledge over time. In accordance with an embodiment, the server 106 may be configured to interact with the DEM system 102, via the communication network 110. The server 106 may be implemented using several technologies that are well known to those skilled in the art. The server 106 may be shown as a single server; however, the server 106 may include more than one server. The server 106 may be deployed locally or remotely in a third-party cloud-based computing environment. For example, in some embodiments, the DEM system 102 may obtain the data from third-party vendors.

It may be appreciated that the server illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The client device 108 may comprise suitable logic, circuitry, interfaces, and code that may be configured to control a display device to determine a position of one or more multi-dimensional objects (such as, buildings) on the visible surface. In accordance with an embodiment, the client device 108 may include more than one client device. Examples of the client device 108 may include, but are not limited to, mobile terminal, fixed terminal, or portable terminal including a mobile handset, station unit, device, multimedia tablet, Internet node, communicator, desktop computer, laptop computer, Personal Digital Assistants (PDAs), head-up display (HUD), projectors, or any computing system that may be capable of performing computation. One or more users may be associated with the client devices 108.

The communication network 110 may comprise suitable logic, circuitry, and interfaces that may be configured to provide a plurality of network ports and a plurality of communication channels for transmission and reception of data, such as visual data, location data, map data and motion data. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The communication network 110 may include a medium through which the location-enabled AR platform system 102, and/or the cloud server 106 may communicate with each other. The communication network 110 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the communication network 110 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication. While the network environment 100 shows the communication network 110 as a single network, the communication network 110 may also include multiple interconnected networks described above.

A person with ordinary skill in the art will understand that the scope of the disclosure is not limited to implementation of the disclosed DEM system and method for determination of position of multi-dimensional object from satellite images, as shown.

In operation, an autonomous driving navigation application may require an actual position of a multi-dimensional object, such as a building, on a map to for navigation of an autonomous vehicle. Therefore, determination of the actual position of a multi-dimensional object is crucial for certain applications, such as the autonomous driving navigation. An accurate Digital Elevation Model (DEM) may be essential for the determination of the actual position of a multi-dimensional object.

The Digital Elevation Model (DEM) may be the digital representation of a land surface elevation with respect to any reference datum. The DEM may be frequently used to refer to any digital representation of a topographic surface. The DEM may be the simplest form of digital representation of topography. Typically, Geographic Information System (GIS) applications may mainly depend on the DEM. The DEM may be commonly used to represent the surface (topography) of a place, through a raster (grid) dataset of elevations.

The generation of the Digital Elevation Model (DEM) from remotely sensed imagery may be crucial for a variety of mapping applications such as ortho-photo generation, city modeling, object recognition, and creation of perspective views. Recently launched high-resolution imaging satellites may constitute an excellent source for efficient, economic, and accurate generation of DEM data for extended areas of the earth's surface. The DEM system 102 may be configured to generate an accurate DEM from normal satellite images that have no terrain information by use of heights of multi-dimensional objects, shadows present in the images and base elevation information obtained from the server 106 for accurate representation of the multi-dimensional objects in reality.

The DEM system 102 may be configured to obtain shadow data of one or more multi-dimensional objects (such as the first multi-dimensional object) from a plurality of multi-dimensional objects on a visible surface from the plurality of satellite images. The plurality of satellite images may be stored in the image database 104. The image database 104 may acquire sensory data from satellite imagery. The image database 104 may include remote acquisition of the sensory information by using remote sensing that may not require direct physical contact. The DEM system 102 may be configured to generate shadow length of the one or more multi-dimensional objects (such as the first multi-dimensional object) from the plurality of multi-dimensional objects on the visible surface based on the shadow data received from the plurality of satellite images stored in the image database 104.

Further, the DEM system 102 may be configured to obtain base elevation data and height data of one or more multi-dimensional objects (such as, the first multi-dimensional object) of the plurality of multi-dimensional objects on the visible surface from the server 106. In case, the base elevation data and the height data of a specific multi-dimensional object may not be available in the server 106, the DEM system 102 may be configured to obtain the base elevation data and the height data of a nearby landmark multi-dimensional object. The nearby landmark multi-dimensional object may be considered to have accurate position on the visible surface. The height data and base elevation data may be utilized by the DEM system 102 for generation of accurate DEM of all the remaining multi-dimensional objects present in the visible surface. The visible surface may correspond to an area of 3-5 sq. km range.

The DEM system 102 may be configured to determine a position of one or more multi-dimensional objects, such as a second multi-dimensional object from the plurality of multi-dimensional objects on the visible surface. Such determination of the position of the second multi-dimensional object may be based on the generated DEM. The plurality of multi-dimensional objects may include natural structures and built structures. The natural structures may include trees, and vegetation. The built structures may include building, tower, water tank and power lines.

Figure 2:
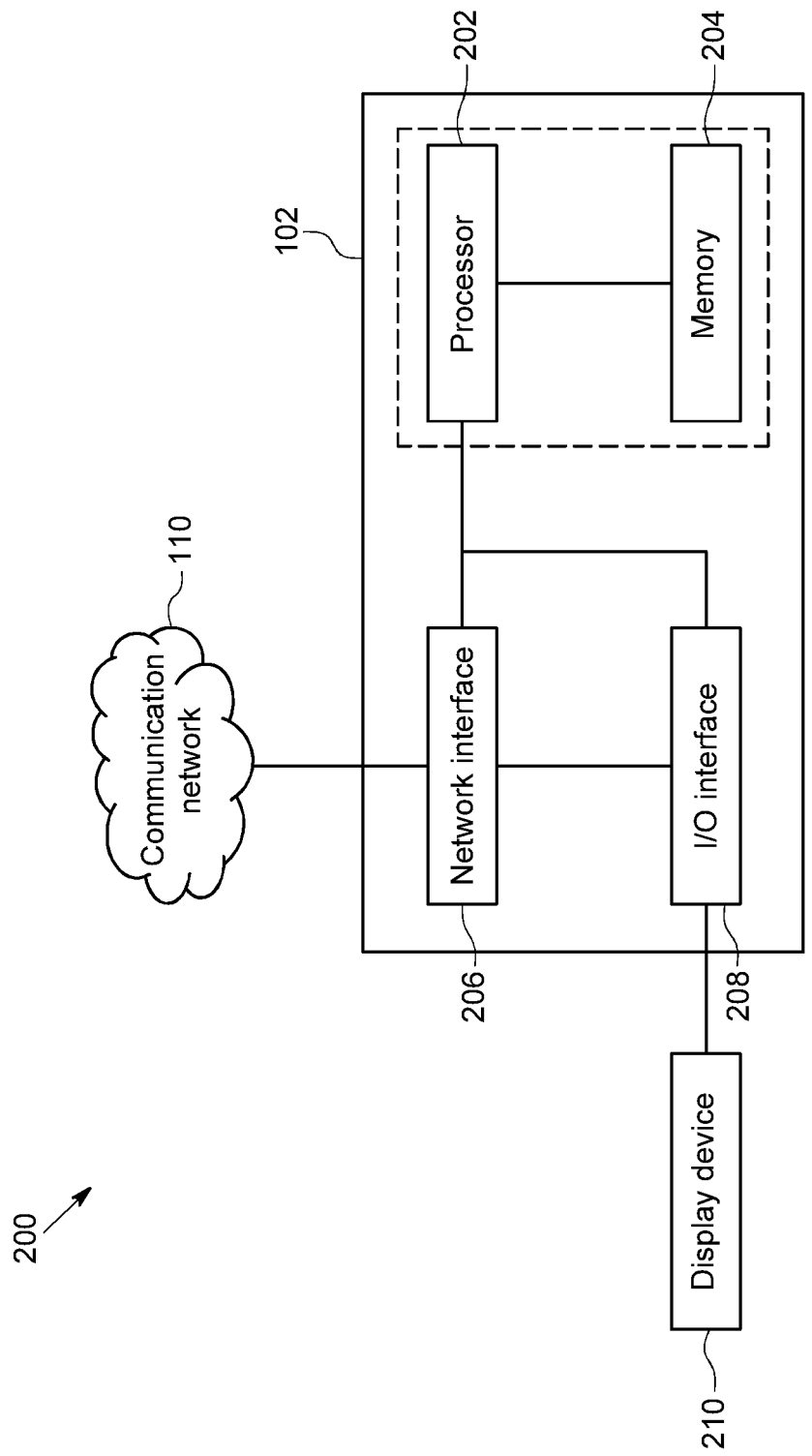
FIG. 2 is a diagram that illustrates a system for determining a position of multi-dimensional object from satellite images, in accordance with an embodiment.

FIG. 2 is a diagram that illustrates a system for determination of position of one or more multi-dimensional objects from satellite images. FIG. 2 is explained in conjunction with elements from FIG. 1. With reference to FIG. 2, there is shown a block diagram 200 of the DEM system 102. The DEM system 102 may include one or more processors, such as a processor 202, a memory 204, a network interface 206 and an input/output (I/O) interface 208. The I/O interface 208 may be connected to a plurality of image acquisition devices 210. The DEM system 102 may include additional modules, fewer modules, or any other suitable combination of modules that perform any suitable operation or combination of operations.

The processor 202 may comprise suitable logic, circuitry, and interfaces that may be configured to execute instructions stored in the memory 204. The processor 202 may be configured to utilize data from the image database 104, server 106 to ingest and processes data in real time or near real time. The processor 202 may be configured to generate a Digital Elevation Model (DEM) of a plurality of multi-dimensional objects on a visible surface captured from satellite images. The processor 202 may be further configured to determine a position of multi-dimensional object (such as, a building) from satellite images. The processor 202 may be further configured to generate shadow length of one or more multi-dimensional objects from the plurality of multi-dimensional objects. The processor 202 may be further configured to control a display device to display a visual representation of the position of one or more multi-dimensional objects on the visible surface. Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

Alternatively, the processor 202 may be embodied as an executor of software instructions, the instructions may specifically configure the processor 202 to perform the algorithms and/or operations described herein when the instructions are executed. However, in some cases, the processor 202 may be a processor of a specific device (for example, a computing device) configured to employ an embodiment by further configuration of the processor 202 by instructions for performing the algorithms and/or operations described herein. The processor 202 may include, among other things, a clock, an arithmetic logic unit (ALU) and logic gates configured to support operation of the processor.

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Additionally or alternatively, the processor 202 may include one or more processors configured in tandem via the bus to enable independent execution of instructions, pipelining and/or multithreading. The processor 202 may implement a number of processor technologies known in the art such as a machine learning model, a deep learning model, such as a recurrent neural network (RNN), a convolutional neural network (CNN), and a feed-forward neural network, or a Bayesian model. The processor 202 may be communicatively coupled to the network interface 206, the I/O interface 208, and the memory 204.

The memory 204 may comprise suitable logic, circuitry, and interfaces that may be configured to store a machine code and/or instructions executable by the processor 202. The memory 204 may stores information including processor instructions for determination of position of multi-dimensional objects from satellite images. The memory 204 may be used by the processor 202 to store temporary values during execution of processor instructions. The memory 204 may be configured to store information, data, content, applications, instructions, or the like for enabling the DEM system 102 to carry out various functions in accordance with an embodiment. For example, the memory 204 may be configured to buffer input data for processing by the processor 202. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the image database 104, the server 106, the client device 108 and other systems and devices in the network environment 100, via the communication network 110. The network interface 206 may communicate with the one or more servers, such as the server 106, via the communication network 110 under the control of the processor 202. The network interface 202 may be implemented by use of known technologies to support wired or wireless communication of the DEM system 102 with the communication network 110. Components of the network interface 206 may include, but are not limited to, an antenna, a radio frequency (RF) transceiver, one or more amplifiers, a tuner, one or more oscillators, a digital signal processor, a coder-decoder (CO-DEC) chipset, a subscriber identity module (SIM) card, and/or a local buffer circuit.

The I/O interface 208 may comprise suitable logic, circuitry, and interfaces that may be configured to operate as an I/O channel/interface between a user (e.g., a user of a smartphone where a navigation application may be installed) and different operational components of the DEM system 102 or other devices. The I/O interface 208 may facilitate an I/O device (for example, an I/O console) to receive an input (e.g., the plurality of images from the satellite imagery) and present an output based on the received input. The I/O interface 208 may include various input and output ports to connect various I/O devices that may communicate with different operational components of the DEM system 102. Examples of the input devices may include, but is not limited to, a touch screen, a keyboard, a mouse, a joystick, a microphone, and an image capture device. Examples of the output devices may include, but is not limited to, a display, a speaker, a haptic output device, or other sensory output devices. The operations performed by the processor 202 of the DEM system 102 have been further described in detail in the FIG. 3 with an exemplary scenario.

Figure 3:
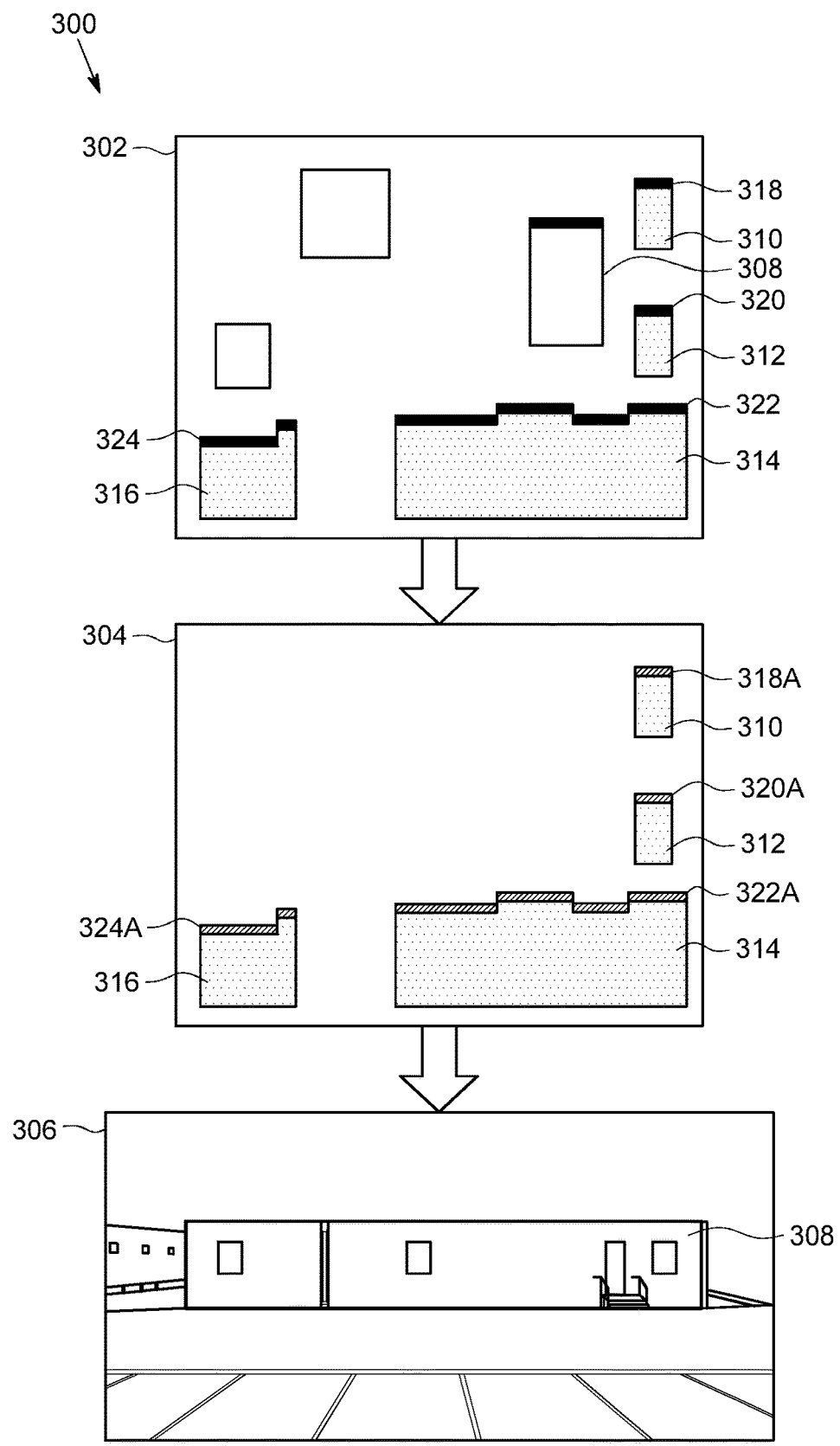
FIG. 3 illustrates an exemplary scenario for implementation of the system and method for determining a position of multi-dimensional object from satellite images, in accordance with an embodiment.

FIG. 3 illustrates an exemplary scenario for implementation of the system and method for determination of position of multi-dimensional object from satellite images, in accordance with an embodiment of the disclosure. FIG. 3 is explained in conjunction with elements from FIG. 1 and FIG. 2. With reference to FIG. 3, there is shown a view 302, a view 304 and a view 306. The view 302 may correspond to one of the captured images from the plurality of images captured as satellite imagery through remote sensing. There is further shown a building 308 whose actual position may be determined and reference buildings 310 to 316 whose shadows are labeled from 318 to 324 in the view 302. The view 304 shows the buildings 310 to 316 with respective calculated shadow lengths 318A to 324A. The view 306 shows the buildings 308 whose actual position on the visible surface may be determined by the DEM system 102.

In accordance with the exemplary scenario, the processor 202 may be configured to obtain, from a plurality of satellite images, shadow data of the reference buildings 310 to 316 from a plurality of multi-dimensional objects on a visible surface. The choice of the satellite images may depend on the data availability for a specific location and time, on the price and the required scale of the application (such as autonomous navigation application). The shadow data of the buildings 310 to 316 may be required for generation of a Digital Elevation Model (DEM). The Digital Elevation Model (DEM) may be an integral part of geo-spatial information of a plurality of multi-dimensional objects, such as the building 308.

In certain scenarios, when a DEM may have to be generated at a very detailed level, the demand for DEM may be fulfilled by LIDAR data from aerial platforms. However, the LIDAR data may be very expensive because of locational charges or may not be available due to flying restrictions. In such scenarios, the DEM from normal satellite may be the best option because the DEM generated from the satellite images may cover large area and may be inexpensive per square km. In accordance with an embodiment, the processor 202 may be configured to obtain the plurality of satellite images from the normal satellite. The processor 202 may be configured to obtain the plurality of images of the satellite imagery from the image database 104. One such image is shown in the view 302 that captures a plurality of buildings in a region on a visible surface. In accordance with an embodiment, the visible surface may be within a range of 3 to 5 square kilometers. An actual position of the building 308 may be determined by the processor 202 based on the shadow data of reference buildings 310 to 314.

The processor 202 may be configured to utilize the shadow data of the reference buildings 310 to 316 to generate shadow lengths for accurate representation of the one or more buildings, such as the building 308 in reality. The actual position of the building 308 may be critical in certain applications, such as autonomous vehicle navigation. Typically, the shadow of an object may differ based on placement of the object. For example, the shadow of a low-lying object may be different from the shadow of the object present at heights. Every object may have shadow of its own. The objects may correspond to buildings, trees, water tank or any multi-dimensional object.

The processor 202 may be further configured to generate shadow length of the buildings 310 to 316, based on the obtained data from the satellite images. The processor 202 may be further configured to extract pixel values from a raster image of one or more buildings (the reference buildings 310 to 316) to calculate the shadow lengths of the reference buildings 310 to 316. In accordance with an embodiment, the processor 202 may be further configured to extract the pixel values through raster pixel value detection. The raster image may have been stored in the memory 204 of the DEM system 102. In accordance with an embodiment, the raster image may have been stored in the image database 104, or cloud storage or other memory device, which may be communicatively coupled with the DEM system 102. Alternatively, the DEM system 102 may process the raster imagery in real time or near real time as the raster imagery may be captured and provided to the DEM system for extraction of the pixel values. Thereby, the pixels representative of the shadows may be identified based upon the pixel values extracted from a raster image.

The processor 202 may be further configured to process the pixel values that have been extracted from the raster image so as to retain pixel values within a predefined range. The processor 202 may be further configured to eliminate pixel values that are out of the predefined range. The retained pixel values within the predefined range may represent shadows 318 to 324. The eliminated pixels may represent features other than the shadows 318 to 324, such as the buildings, terrain or other objects. The pixel values that may represent a black color or a color nearly black may be considered to be representative of shadows 318 to 324, as shown in view 302. In other words, the pixels from the raster image that have pixels value representative of a black color or colors that are nearly black may be retained as representative of a shadow by the processor 202.

The processor 202 may be further configured to obtain base elevation data and height data of the reference buildings 310 to 316 on the visible surface from the server 106. The height data of the reference buildings 310 to 316 may correspond to heights of each of the reference buildings 310 to 316. The height data may be the vertical distance of the reference buildings 310 to 316 to the horizontal surface. The base elevation data may be the height of the reference buildings 310 to 316 above (or below) sea level. The view 304 represents the reference buildings 310 to 316 and the calculated shadow lengths 310A to 316A. With reference to view 304, the processor 202 may be configured to utilize the shadow data from the satellite images, the height data and the base elevation data of the reference buildings 310 to 316 from the server 106. The processor 202 may be further configured to height to base ratio of the reference buildings 310 to 316 from the height data and the elevation data. The height to base ratio of the reference buildings 310 to 316 may be utilized by the processor 202 to calculate the base elevation data of the rest of the multi-dimensional objects, such as the building 308 in the view 302.

The processor 202 may be further configured to generate a Digital Elevation Model (DEM) of the plurality of multi-dimensional objects on the visible surface based on the shadow data, the base elevation data and the height data of the reference buildings 310 to 316. The accuracy of the generated DEM may be represented by the spatial resolution (grid space) and the height accuracy of the of the reference buildings 310 to 316. The processor 202 may be further configured to perform image matching for the plurality of images acquired from the satellite. In accordance with an embodiment, the image matching may correspond to the grid point matching. The processor 202 may achieve sub-pixel accuracy for all the matched features. In accordance with an embodiment, the image coordinates in view 302 (two dimensional image) of the points may be transformed in a 3D point cloud in the DEM system. In accordance with an embodiment, the transformation may be done by forward intersection. The raster data of the plurality of images may be overlaid on the generated DEM to obtain a 3D combined model. The finer the resolution of the sensor of the satellite, the higher the resolution and detail of the generated DEM.

The processor 202 may be further configured to determine a position of the building 308 on the visible surface. Such determination of the position of the building may be based on the generated DEM. The view 306 shows the actual position of the building 308 on a map of autonomous vehicle navigation application. The processor 202 may be further configured to control the display device 210 to display a visual representation of the position of the at least second multi-dimensional object on the visible surface.

Figure 4:
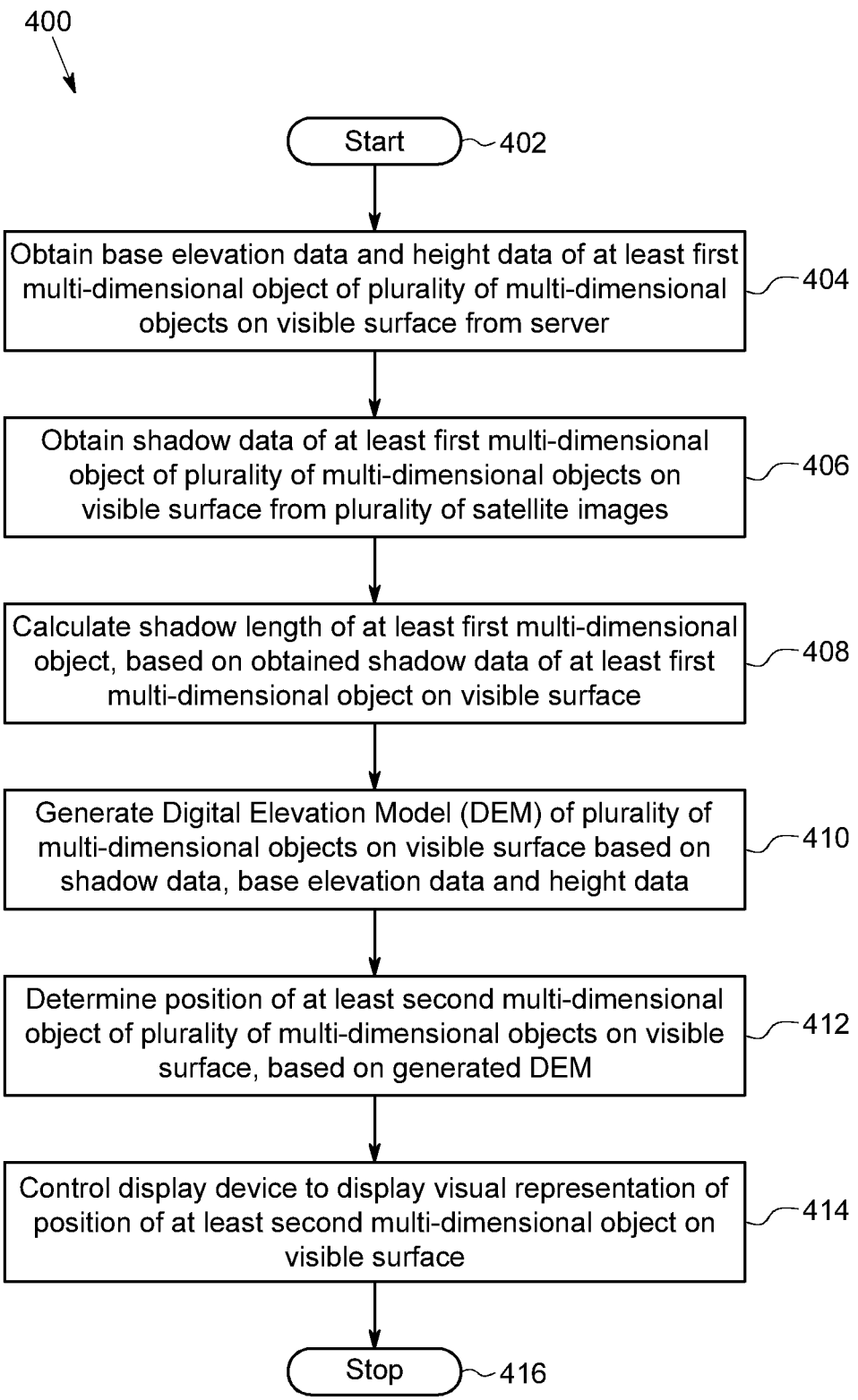
FIG. 4 is a flow chart that shows a processing pipeline for implementation of an exemplary method for determining a position of multi-dimensional object from satellite images, in accordance with an embodiment.

FIG. 4 illustrates a flowchart for implementation of an exemplary method for determination of position of multi-dimensional object from satellite images, in accordance with an embodiment of the disclosure. With reference to FIG. 4, there is shown a flowchart 400. The flowchart 400 is described in conjunction with elements from FIGS. 1, 2 and 3. The method, in accordance with the flowchart 400, may be implemented in the DEM system 102. The method starts at 402 and proceeds to 404.

At 404, base elevation data and height data of the at least first multi-dimensional object of the plurality of multi-dimensional objects may be obtained on the visible surface from the server 106. The processor 202 may be configured to obtain base elevation data and height data of the at least first multi-dimensional object of the plurality of multi-dimensional objects on the visible surface from a server. The plurality of multi-dimensional objects may include natural structures and built structures. The natural structures may include trees and vegetation. The built structures may include building, tower, water tank, and power lines.

At 406, shadow data of at least a first multi-dimensional object of the plurality of multi-dimensional objects may be obtained on the visible surface from a plurality of satellite images. The processor 202 may be configured to obtain shadow data of at least a first multi-dimensional object of the plurality of multi-dimensional objects on a visible surface from a plurality of satellite images.

At 408, shadow length of the at least first multi-dimensional object may be calculated. The processor 202 may be configured to calculate shadow length of the at least first multi-dimensional object. Such calculation of the shadow length may be based on the obtained shadow data of the at least first multi-dimensional object on the visible surface. The shadow data may include multi-direction shadows of the at least first multi-dimensional object.

At 410, a Digital Elevation Model (DEM) of the plurality of multi-dimensional objects may be generated on the visible surface. The processor 202 may be configured to generate a Digital Elevation Model (DEM) of the plurality of multi-dimensional objects on the visible surface. Such generation of the DEM may be based on the shadow data, the base elevation data and the height data. The processor 202 may be configured to generate the DEM based on two or more overlapping images of the plurality of images. The processor 202 may be configured to generate the DEM based on image resolution and image contrast of the plurality of images and a height-to-base-relation of the plurality of multi-dimensional objects.

At 412, the position of the at least second multi-dimensional object of the plurality of multi-dimensional objects may be determined on the visible surface. The processor 202 may be configured to determine the position of the at least second multi-dimensional object of the plurality of multi-dimensional objects on the visible surface. Such determination of the position of the at least second multi-dimensional object may be based on the generated DEM.

At 414, a display device may be controlled to display a visual representation of the position of the at least second multi-dimensional object on the visible surface. The processor 202 may be configured to control a display device to display a visual representation of the position of the at least second multi-dimensional object on the visible surface. The control passes to an end at 416.

Various embodiments of the disclosure may provide a non-transitory computer readable medium and/or storage medium, and/or a non-transitory machine readable medium and/or storage medium with a machine code and/or a set of instructions stored thereon and executable by a machine and/or a computer for determining a position of at least a second multi-dimensional object of a plurality of multi-dimensional objects. The set of instructions in the DEM system 102 may cause the machine and/or computer to perform the steps that includes obtaining shadow data of at least a first multi-dimensional object of the plurality of multi-dimensional objects on a visible surface from a plurality of satellite images. The processor 202 may be configured to obtain shadow data of at least a first multi-dimensional object of the plurality of multi-dimensional objects on a visible surface from a plurality of satellite images. Base elevation data and height data of the at least first multi-dimensional object of the plurality of multi-dimensional objects on the visible surface may be obtained from the server 106 (FIG. 1). The processor 202 may be configured to obtain base elevation data and height data of the at least first multi-dimensional object of the plurality of multi-dimensional objects on the visible surface from a server. A Digital Elevation Model (DEM) of the plurality of multi-dimensional objects may be generated on the visible surface based on the shadow data, the base elevation data and the height data. The processor 202 may be configured to generate a Digital Elevation Model (DEM) of the plurality of multi-dimensional objects on the visible surface. Such generation of the DEM may be based on the shadow data, the base elevation data and the height data. The position of the at least second multi-dimensional object of the plurality of multi-dimensional objects may be determined on the visible surface, based on the generated DEM. The processor 202 may be configured to determine the position of the at least second multi-dimensional object of the plurality of multi-dimensional objects on the visible surface.

In accordance with an embodiment, shadow length of the at least first multi-dimensional object may be calculated, based on the obtained shadow data of the at least first multi-dimensional object on the visible surface. The processor 202 may be configured to calculate shadow length of the at least first multi-dimensional object. Such calculation of the shadow length may be based on the obtained shadow data of the at least first multi-dimensional object on the visible surface.

In accordance with an embodiment, the plurality of multi-dimensional objects may include natural structures and built structures. The natural structures may comprise trees and vegetation. The built structures may comprise building, tower, water tank, and power lines.

In accordance with an embodiment, the DEM may be generated based on two or more overlapping images of the plurality of images. The processor 202 may be configured to generate the DEM based on two or more overlapping images of the plurality of images In accordance with an embodiment, the DEM may be generated based on image resolution and image contrast of the plurality of images and a height-to-base-relation of the plurality of multi-dimensional objects. The processor 202 may be configured to generate the DEM based on image resolution and image contrast of the plurality of images and a height-to-base-relation of the plurality of multi-dimensional objects.

In accordance with an embodiment, a display device 210 may be controlled to display a visual representation of the position of the at least second multi-dimensional object on the visible surface. The processor 202 may be configured to control a display device to display a visual representation of the position of the at least second multi-dimensional object on the visible surface. The display device 210 may be communicatively coupled to the client device 108. In accordance with an embodiment, the shadow data may include multi-direction shadows of the at least first multi-dimensional object.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein.

The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

I claim:

1. A system for determining a position of a second multi-dimensional object of a plurality of multi-dimensional objects, the system comprising:
   at least one memory configured to store instructions; and
   at least one processor configured to execute the instructions to:
   obtain, from a plurality of satellite images, shadow data of a first multi-dimensional object of the plurality of multi-dimensional objects on a visible surface;
   obtain from a server base elevation data and height data of the first multi-dimensional object of the plurality of multi-dimensional objects on the visible surface;
   obtain base elevation data and height data of a nearby landmark multi-dimensional object having accurate position on the visible surface when the base elevation data and height data of the first multi-dimensional object are not available from the server;
   generate a Digital Elevation Model (DEM) of the plurality of multi-dimensional objects on the visible surface based on the shadow data, and the base elevation data and height data of the nearby landmark multi-dimensional object; and
   determine the position of the second multi-dimensional object of the plurality of multi-dimensional objects on the visible surface, based on the generated DEM.

2. The system of claim 1, wherein the at least one processor is further configured to calculate shadow length of the first multi-dimensional object, based on the obtained shadow data of the first multi-dimensional object on the visible surface.

3. The system of claim 1, wherein the plurality of multi-dimensional objects comprises natural structures and built structures, wherein the natural structures comprise trees and vegetation, and wherein the built structures comprise building, tower, water tank, and power lines.

4. The system of claim 1, wherein the at least one processor is further configured to generate the DEM based on two or more overlapping images of the plurality of images.

5. The system of claim 1, wherein the at least one processor is further configured to generate the DEM based on image resolution and image contrast of the plurality of images and a height-to-base-relation of the plurality of multi-dimensional objects.

6. The system of claim 1, wherein the at least one processor is further configured to control a display device to display a visual representation of the position of the second multi-dimensional object on the visible surface.

7. The system of claim 1, wherein the shadow data includes multi-direction shadows of the first multi-dimensional object.

8. A method for determining a position of a second multi-dimensional object of a plurality of multi-dimensional objects, the method comprising:
- obtaining, by a processor from a plurality of satellite images, shadow data of a first multi-dimensional object of the plurality of multi-dimensional objects on a visible surface;
- obtaining from a server base elevation data and height data that are not available of the first multi-dimensional object of the plurality of multi-dimensional objects on the visible surface;
- obtaining, by the processor, base elevation data and height data of a nearby landmark multi-dimensional object having accurate position on the visible surface when the base elevation data and height data of the first multi-dimensional object are not available from the server;
- generating, by the processor, a Digital Elevation Model (DEM) of the plurality of multi-dimensional objects on the visible surface based on the shadow data, and the base elevation data and height data of the nearby landmark multi-dimensional object; and
- determining, by the processor, the position of the second multi-dimensional object of the plurality of multi-dimensional objects on the visible surface, based on the generated DEM.

9. The method of claim 8, further comprising calculating shadow length of the first multi-dimensional object, based on the obtained shadow data of the first multi-dimensional object on the visible surface.

10. The method of claim 8, wherein the plurality of multi-dimensional objects comprises natural structures and built structures, wherein the natural structures comprise trees and vegetation, and wherein the built structures comprise building, tower, water tank, and power lines.

11. The method of claim 8, further comprising generating the DEM based on two or more overlapping images of the plurality of images.

12. The method of claim 8, further comprising generating the DEM based on image resolution and image contrast of the plurality of images and a height-to-base-relation of the plurality of multi-dimensional objects.

13. The method of claim 8, further comprising controlling a display device to display a visual representation of the position of the second multi-dimensional object on the visible surface.

14. The method of claim 8, wherein the shadow data includes multi-direction shadows of the first multi-dimensional object.

15. A computer program product comprising at least one non-transitory computer-readable storage medium having stored thereon computer-executable program code instructions which when executed by a computer, cause the computer to carry out operations for determining a position of a second multi-dimensional object of a plurality of multi-dimensional objects, the operations comprising:
- obtaining, by a processor, from a plurality of satellite images, shadow data of a first multi-dimensional object of the plurality of multi-dimensional objects on a visible surface;
- obtaining from a server base elevation data and height data of the first multi-dimensional object of the plurality of multidimensional objects on the visible surface;
- obtaining, by the processor, base elevation data and height data of a nearby landmark multi-dimensional object having accurate position on the visible surface when the base elevation data and height data of the first multi-dimensional object are not available from the server;
- generating, by the processor, a Digital Elevation Model (DEM) of the plurality of multi-dimensional objects on the visible surface based on the shadow data, and the base elevation data and height data of the nearby landmark multi-dimensional object; and
- determining, by the processor, the position of the second multi-dimensional object of the plurality of multi-dimensional objects on the visible surface, based on the generated DEM.

16. The computer program product of claim 15, wherein the operations further comprise calculating shadow length of the first multi-dimensional object, based on the obtained shadow data of the first multi-dimensional object on the visible surface.

17. The computer program product of claim 15, wherein the plurality of multi-dimensional objects comprises natural structures and built structures, wherein the natural structures comprise trees and vegetation, and wherein the built structures comprise building, tower, water tank, and power lines.

18. The computer program product of claim 15, wherein the operations further comprise generating the DEM based on two or more overlapping images of the plurality of images.

19. The computer program product of claim 15, wherein the operations further comprise generating the DEM based on image resolution and image contrast of the plurality of images and a height-to-base-relation of the plurality of multi-dimensional objects.

20. The computer program product of claim 15, wherein the operations further comprise control a display device to display a visual representation of the position of the second multi-dimensional object on the visible surface.

* * * * *